(12) United States Patent
He

(10) Patent No.: US 12,113,672 B2
(45) Date of Patent: Oct. 8, 2024

(54) CONFIGURATION INFORMATION SHARING METHOD, TERMINAL DEVICE, AND COMPUTER READABLE STORAGE MEDIUM

(71) Applicant: VIVO MOBILE COMMUNICATION CO., LTD., Dongguan (CN)

(72) Inventor: Xiaofan He, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 84 days.

(21) Appl. No.: 17/866,838

(22) Filed: Jul. 18, 2022

(65) Prior Publication Data

US 2022/0353144 A1 Nov. 3, 2022

Related U.S. Application Data

(63) Continuation of application No. PCT/CN2021/072087, filed on Jan. 15, 2021.

(30) Foreign Application Priority Data

Jan. 22, 2020 (CN) .......................... 202010074397.4

(51) Int. Cl.
*H04L 41/084* (2022.01)
*H04L 41/22* (2022.01)
*G06F 3/0482* (2013.01)

(52) U.S. Cl.
CPC .......... *H04L 41/0846* (2013.01); *H04L 41/22* (2013.01); *G06F 3/0482* (2013.01)

(58) Field of Classification Search
None
See application file for complete search history.

(56) References Cited

U.S. PATENT DOCUMENTS

| | | | |
|---|---|---|---|
| 7,865,578 B1 * | 1/2011 | Gerraty | H04L 45/02 713/1 |
| 8,805,972 B1 * | 8/2014 | Merkulov | H04W 12/08 709/221 |
| 9,154,379 B2 * | 10/2015 | Nesse | H04L 41/0803 |
| 9,442,476 B2 * | 9/2016 | Bliss | G06F 8/63 |

(Continued)

FOREIGN PATENT DOCUMENTS

| CN | 103297459 A | 9/2013 |
|---|---|---|
| CN | 103457964 A | 12/2013 |

(Continued)

OTHER PUBLICATIONS

Extended European Search Report issued in related European Application No. 21744301.9, mailed Dec. 13, 2022, 9 pages.

(Continued)

*Primary Examiner* — Quang N Nguyen
(74) *Attorney, Agent, or Firm* — IPX PLLC

(57) ABSTRACT

A configuration information sharing method, a terminal device, and a computer-readable storage medium are provided. The configuration information sharing method, performed by a first terminal device, includes: obtaining first configuration information, where the first configuration information includes at least one of system configuration information or application configuration information of the first terminal device; and sharing the first configuration information.

10 Claims, 6 Drawing Sheets

(56) References Cited

U.S. PATENT DOCUMENTS

| | | | |
|---|---|---|---|
| 10,225,143 B2* | 3/2019 | King | G08C 17/02 |
| 10,511,630 B1* | 12/2019 | Weiss | H04L 63/20 |
| 10,742,649 B1* | 8/2020 | Hook, Jr. | H04L 63/0272 |
| 2002/0161867 A1* | 10/2002 | Cochran | H04L 41/12 |
| | | | 709/224 |
| 2015/0205492 A1* | 7/2015 | Nobil | G06F 16/438 |
| | | | 715/716 |
| 2016/0197773 A1 | 7/2016 | Pandrangi et al. | |
| 2016/0234625 A1 | 8/2016 | Wang et al. | |
| 2016/0380830 A1 | 12/2016 | Cheng et al. | |
| 2017/0034264 A1 | 2/2017 | Yang et al. | |
| 2019/0373028 A1 | 12/2019 | Kasula | |
| 2021/0184877 A1* | 6/2021 | Blum | H04N 21/6582 |
| 2021/0301985 A1* | 9/2021 | Brown | G05B 23/0221 |
| 2023/0028513 A1* | 1/2023 | Garel | G06F 9/4406 |

FOREIGN PATENT DOCUMENTS

| | | |
|---|---|---|
| CN | 106254402 A | 12/2016 |
| CN | 106705360 A | 5/2017 |
| CN | 108810262 A | 11/2018 |
| CN | 109002707 A | 12/2018 |
| CN | 109905260 A | 6/2019 |
| CN | 110536015 A | 12/2019 |
| CN | 111327458 A | 6/2020 |
| EP | 2798510 A1 | 11/2014 |

OTHER PUBLICATIONS

International Search Report issued in corresponding International Application No. PCT/CN2021/072087, mailed Apr. 8, 2021, 4 pages.

First Office Action issued in related Chinese Application No. 202010074397.4, mailed Mar. 9, 2022, 12 pages.

* cited by examiner

CONFIGURATION INFORMATION SHARING METHOD, TERMINAL DEVICE, AND COMPUTER READABLE STORAGE MEDIUM

CROSS-REFERENCE TO RELATED APPLICATIONS

This application is a continuation of International Application No. PCT/CN2021/072087, filed on Jan. 15, 2021, which claims priority to Chinese Patent Application No. 202010074397.4 filed on Jan. 22, 2020. The entire contents of each of the above-referenced applications are expressly incorporated herein by reference.

TECHNICAL FIELD

The present disclosure relates to the field of communications technologies, and in particular to a configuration information sharing method, a terminal device, and a computer-readable storage medium.

BACKGROUND

As hardware capabilities of terminal devices are increasingly improved, a growing number services and applications are provided on the terminal devices, and corresponding system configuration and application configuration are increasingly complicated. System configuration and application configuration on a terminal device are usually set by a user on corresponding configuration interfaces. Therefore, an existing method for setting configuration information on a terminal device is complicated during operation.

SUMMARY

The present disclosure is implemented as follows:

According to a first aspect, an embodiment of the present disclosure provides a configuration information sharing method, applied to a first terminal device, and including:
  obtaining first configuration information, where the first configuration information includes at least one of system configuration information and application configuration information of the first terminal device; and
  sharing the first configuration information.

According to a second aspect, an embodiment of the present disclosure provides a configuration information sharing method, applied to a second terminal device, and including:
  obtaining first configuration information from a second target device; and
  setting configuration of the second terminal device according to the first configuration information,
  where the first configuration information includes at least one of system configuration information and application configuration information of a first terminal device; and the second target device is any one of the first terminal device, a cloud server, or a public platform.

According to a third aspect, an embodiment of the present disclosure provides a terminal device, where the terminal device is a first terminal device and includes:
  a first obtaining module, configured to obtain first configuration information, where the first configuration information includes at least one of system configuration information and application configuration information of the first terminal device; and
  a sharing module, configured to share the first configuration information.

According to a fourth aspect, an embodiment of the present disclosure provides a terminal device, where the terminal device is a second terminal device and includes:
  a second obtaining module, configured to obtain first configuration information from a second target device; and
  a setting module, configured to set configuration of the second terminal device according to the first configuration information,
  where the first configuration information includes at least one of system configuration information and application configuration information of a first terminal device; and the second target device is any one of the first terminal device, a cloud server, or a public platform.

According to a fifth aspect, an embodiment of the present disclosure provides a terminal device, including a memory, a processor, and a computer program that is stored in the memory and that can be run on the processor, where when the computer program is executed by the processor, the steps of the foregoing configuration information sharing method are implemented.

According to a sixth aspect, an embodiment of the present disclosure provides a computer-readable storage medium, where the computer-readable storage medium stores a computer program, and when the computer program is executed by a processor, the steps of the foregoing configuration information sharing method are implemented.

In this embodiment of the present disclosure, the first terminal device may share its own system configuration information and/or application configuration information. This way, the user can set configuration of another terminal device according to the configuration information shared by the first terminal device, thereby reducing repeated setting operations, simplifying setting operations, and improving user experience to a certain extent.

Further, through the configuration information sharing method of this embodiment, good system configuration and/or application configuration can further be disseminated, thereby helping some people who are not familiar with terminal devices (such as mobile phones) to set or optimize configuration of their own devices and improve device performance.

BRIEF DESCRIPTION OF DRAWINGS

The technical solutions of the embodiments of the present disclosure are described together with accompanying drawings. The following briefly describes the accompanying drawings. Apparently, the accompanying drawings in the following description show merely some embodiments of the present disclosure, and a person of ordinary skill in the art may still derive other drawings from these accompanying drawings without creative efforts.

DETAILED DESCRIPTION

To describe the technical solutions of the embodiments of the present disclosure more clearly, the following briefly describes the accompanying drawings required for the embodiments of the present disclosure. Apparently, the accompanying drawings in the following description show merely some embodiments of the present disclosure, and a person of ordinary skill in the art may still derive other drawings from these accompanying drawings without creative efforts.

Figure 1:
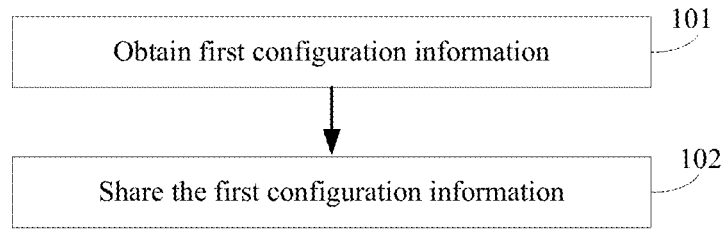
FIG. 1 is a flowchart of a configuration information sharing method according to an embodiment of the present disclosure.

Referring to FIG. 1, FIG. 1 is a flowchart of a configuration information sharing method according to an embodiment of the present disclosure. The method is applied to a first terminal device. As shown in FIG. 1, the method includes the following steps.

Step 101: Obtain first configuration information.

In this embodiment, the first configuration information is configuration information to be shared. The first configuration information may include at least one of system configuration information and application configuration information of the first terminal device. In some embodiments, the system configuration information may be all or a part of the system configuration information of the first terminal device. The application configuration information may be all or a part of the application configuration information of the first terminal device.

For example, the system configuration information may include but is not limited to at least one of the following: enabling automatic system update, disabling automatic system update, enabling intelligent screen recognition, Hotspot configuration information, enabling Mistouch prevention, Scheduled power on/off, or the like.

For another example, the application configuration information may include but is not limited to at least one of the following: enabling message push of application 1, disabling message push of application 2, enabling new message notification receiving of application 3, enabling push do-not-disturb of application 4, disabling push do-not-disturb of application 5, or the like.

Step 102: Share the first configuration information.

In this embodiment, the sharing may also be understood as synchronization. When sharing the first configuration information, the first terminal device may share the first configuration information to a first target device. The first target device may be any one of a second terminal device, a cloud server, or a public platform. The second terminal device is a device different from the first terminal device. The public platform may also be referred to as a public platform server.

In an implementation manner, the second terminal device is used as an example, and the first terminal device can send configuration information (that is, the first configuration information) to be shared, to the second device in the form of a file through an instant communication tool such as Bluetooth, WeChat, or SMS, so that the second terminal device can set its own configuration according to received configuration information, thereby reducing repeated and complex setting operations by the user.

In another implementation manner, the cloud server is used as an example, and the first terminal device can synchronize the configuration information (that is, the first configuration information) to be shared, to the cloud server, so that another terminal devices (such as the second terminal device replaced by the user) can obtain the configuration information from the cloud server, and set its own configuration according to the configuration information, thereby reducing repeated and complex setting operations by the user. A synchronization method can be an existing cloud synchronization method, such as a cloud synchronization method for a photo.

In still another implementation manner, the public platform is used as an example, and the first terminal device can upload, through a communication tool such as Weibo, WeChat Moments, or QQ space, the configuration information (that is, the first configuration information) to be shared in a form of a file to the public platform, so that another terminal device can download the configuration information from the public platform, and set its own configuration according to the configuration information, thereby reducing repeated and complex setting operations by the user.

In this embodiment of the present disclosure, the first terminal device may share its own system configuration information and/or application configuration information. This way, the user can set configuration of another terminal device according to the configuration information shared by the first terminal device, thereby reducing repeated setting operations, simplifying setting operations, and improving user experience to a certain extent.

Further, through the configuration information sharing method of this embodiment, good system configuration and/or application configuration can further be disseminated, thereby helping some people who are not familiar with terminal devices (such as mobile phones) to set or optimize configuration of their own devices and improve device performance.

In this embodiment of the present disclosure, when the first target device is the second terminal device or the public platform, a process of sharing the first configuration information to the first target device may be:

displaying a communication tool selection interface;

receiving a second input for selecting a target communication tool on the communication tool selection interface; and sending the first configuration information to the second terminal device or the public platform through the target communication tool in response to the second input.

In some embodiments, the communication tool selection interface may be displayed based on a click operation (such as clicking a virtual button), a pressing operation, a sliding operation, or the like of the user. The second input may be a click operation (such as clicking a virtual button), a pressing operation, a sliding operation, or the like on the target communication tool.

As an implementation manner, the first configuration information may be sent to the second terminal device through a corresponding target communication tool such as Bluetooth, WeChat, or SMS. The first configuration information may be sent to the public platform through a corresponding target communication tool such as Weibo, WeChat Moments, or QQ space. The first configuration information may be sent in a form of a file.

In this embodiment of the present disclosure, to facilitate the user to view and modify currently set configuration information, currently set system configuration information and/or application configuration information may be displayed centrally. In some embodiments, before step 101, the method may further include:

displaying a configuration information display interface, where at least one of system configuration information and application configuration information of the first terminal device is displayed on the configuration information display interface. This way, the user can view and quickly modify currently set configuration information.

A process of obtaining the first configuration information in step 101 may include:

receiving a second input for selecting configuration information on the configuration information display interface; and obtaining the first configuration information in response to the second input.

In some embodiments, the first configuration information may include at least one of the following:

a part of the system configuration information (that is, system configuration information displayed on the configuration information display interface);

a part of the application configuration information (that is, application configuration information displayed on the configuration information display interface);

second configuration information, where the second configuration information is a part of modified system configuration information (that is, system configuration information displayed on the configuration information display interface), and the second configuration information will not change configuration of the first terminal device; or third configuration information, where the third configuration information is a part of modified application configuration information (that is, application configuration information displayed on the configuration information display interface), and the third configuration information will not change configuration of the first terminal device.

For example, the first configuration information includes a part of the system configuration information and/or the application configuration information. For another example, the first configuration information includes a part of modified configuration information, where the part of modified configuration information is a part of the system configuration information and/or the application configuration information. For still another example, the first configuration information includes a part of the system configuration information and/or the application configuration information, and a part of modified configuration information, where the part of the configuration information is a part of the system configuration information and/or the application configuration information.

It should be noted that, the configuration information display interface may be entered based on a click operation, a sliding operation, or a voice control operation triggered by a user to enter the configuration information display interface. There can be multiple entrances into the configuration information display interface. For example, a "User configuration items" function is added to "Settings" and "Quick center" to enter the configuration information display interface through user operations; or, an APP is created separately to provide a service of displaying configuration information.

As an implementation manner, the configuration information displayed on the configuration information display interface may include two types: changing setting from default Off to On, and changing setting from default On to Off. The configuration information displayed on the configuration information display interface may include all or a part of the system configuration information of the first terminal device, and/or include all or a part of the application configuration information of the first terminal device.

As an implementation manner, because the user usually pays more attention to configuration set by itself, but pays less attention to some default conventional configuration of the terminal, to highlight the configuration set by the user, only the configuration information set by the user instead of all configuration information can be displayed on the configuration information display interface.

To facilitate user's viewing, the configuration information displayed on the configuration information display interface may be displayed according to dimensions such as "System configuration" and "Application configuration". It should be pointed out that the configuration information can be displayed according to an actual design scheme, so that configuration information currently set by the user can be clearly displayed, which is not limited in this embodiment.

Figure 2:
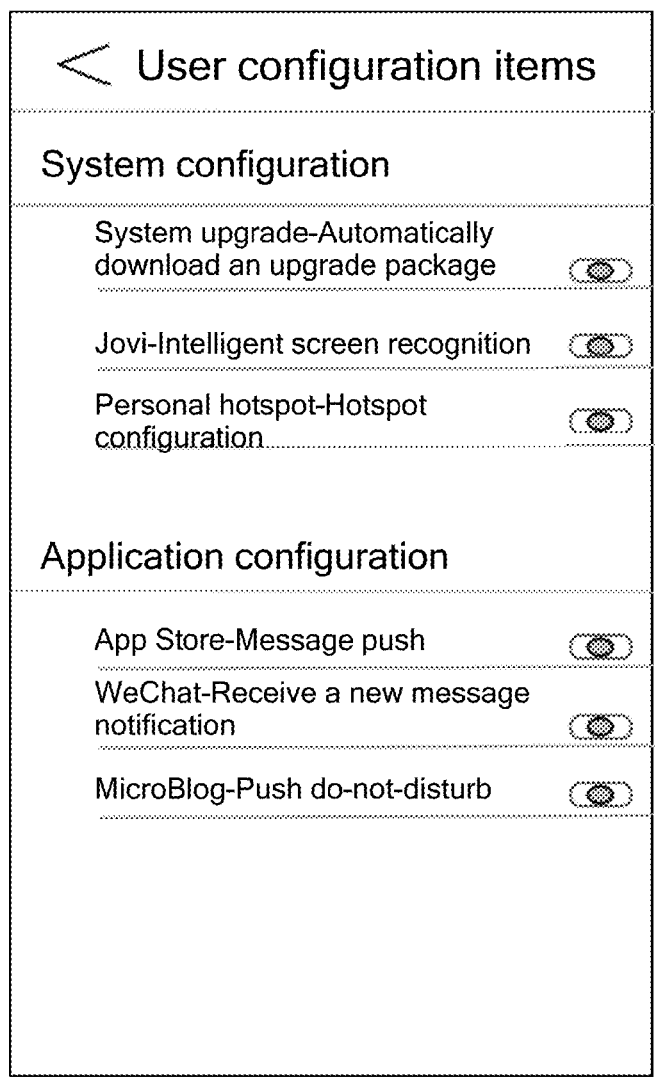
FIG. 2 is a first schematic diagram of a configuration information display interface according to a specific embodiment of the present disclosure.
Figure 3:
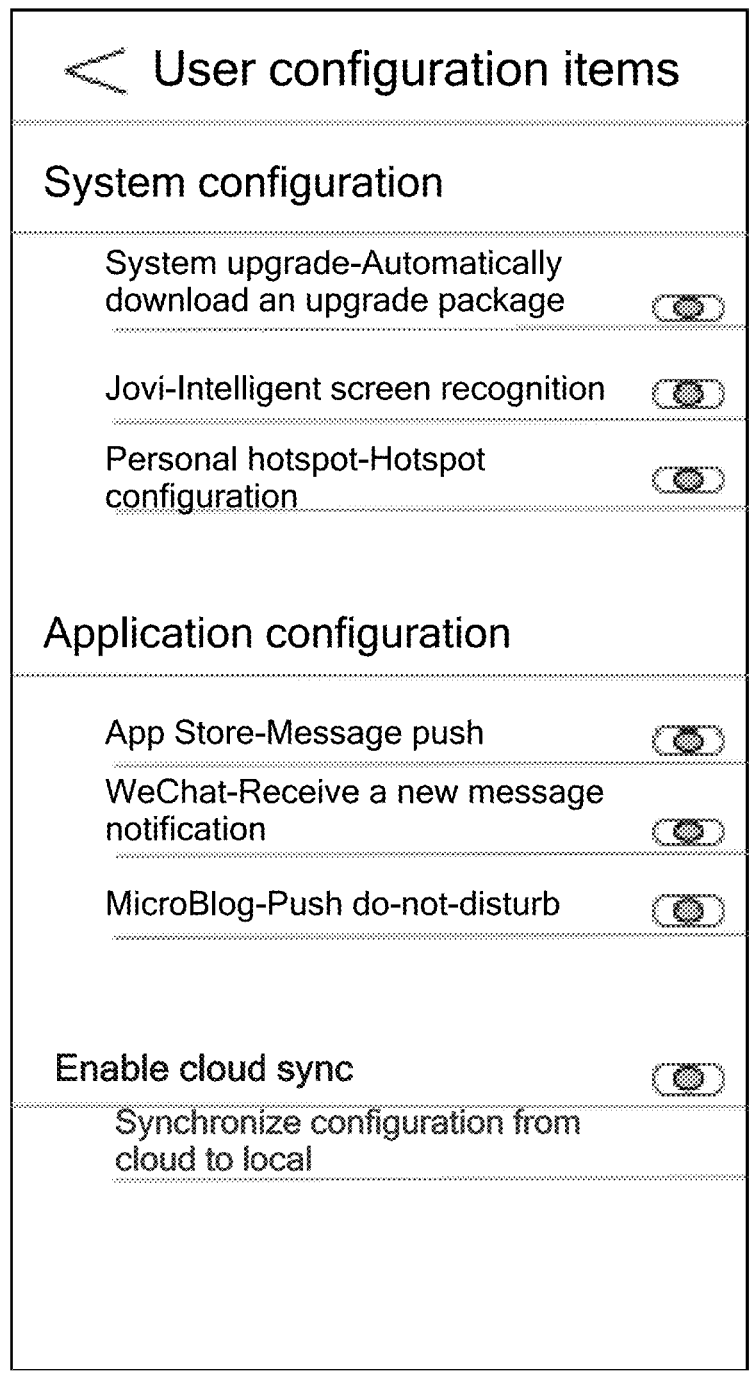
FIG. 3 is a second schematic diagram of the configuration information display interface according to a specific embodiment of the present disclosure.

For example, the configuration information display interface of the terminal device such as a mobile phone may be as shown in FIG. 2, and the configuration information display interface may be called a "User configuration items" page, and currently set configuration information displayed on the interface is displayed through two dimensions of the "System configuration" and "Application configuration". Further, as shown in FIG. 3, an option button indicating whether to enable cloud synchronization, and a virtual button indicating "Synchronize configuration from cloud to local" may further be displayed on the "User configuration items" page. After the user enables a cloud synchronization function by operating the option button, the mobile phone system can automatically and regularly synchronize currently set configuration information to the cloud server. If the configuration information needs to be synchronized from the cloud server to the mobile phone, the user can click a button indicating "Synchronize configuration from cloud to local" to synchronize configuration information from the cloud server to the mobile phone, and set mobile phone configuration according to the configuration information.

Figure 4A:
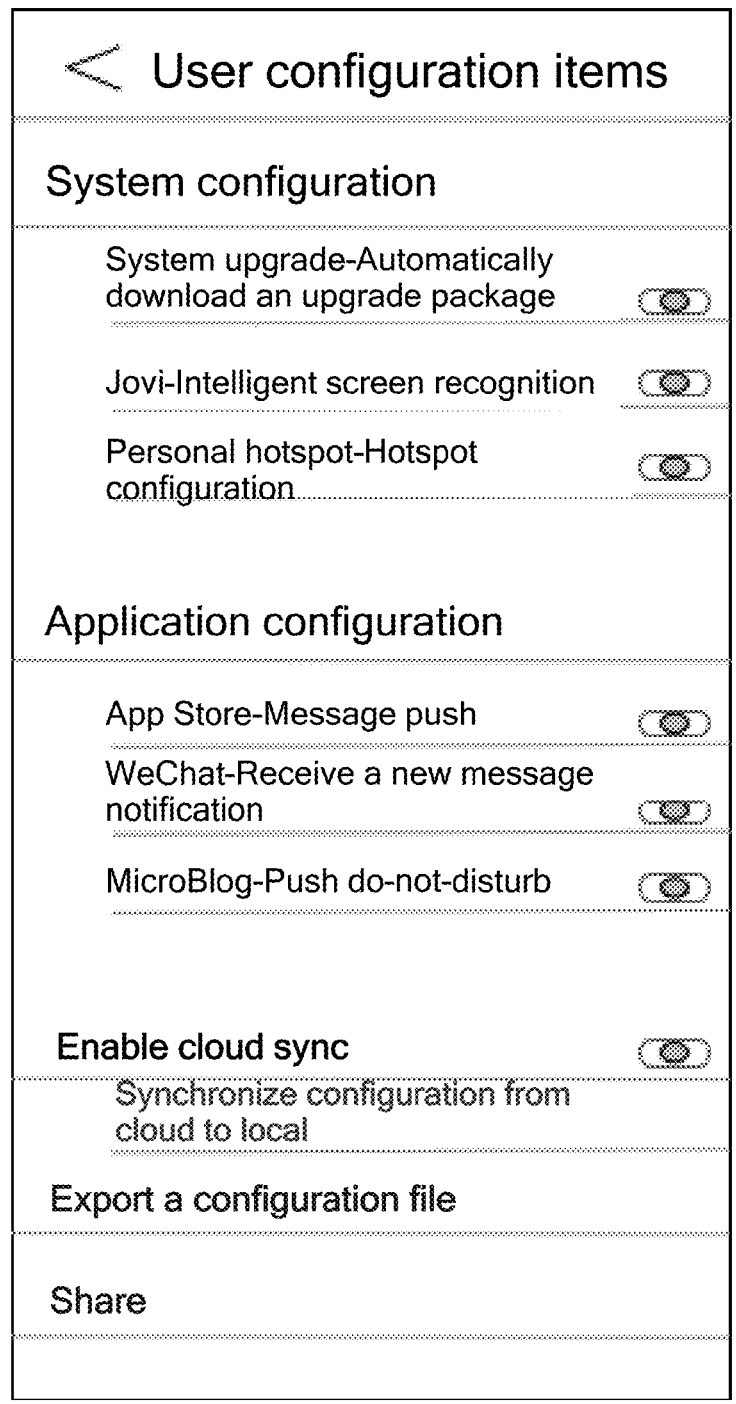
FIG. 4A is a third schematic diagram of the configuration information display interface according to a specific embodiment of the present disclosure.
Figure 4B:
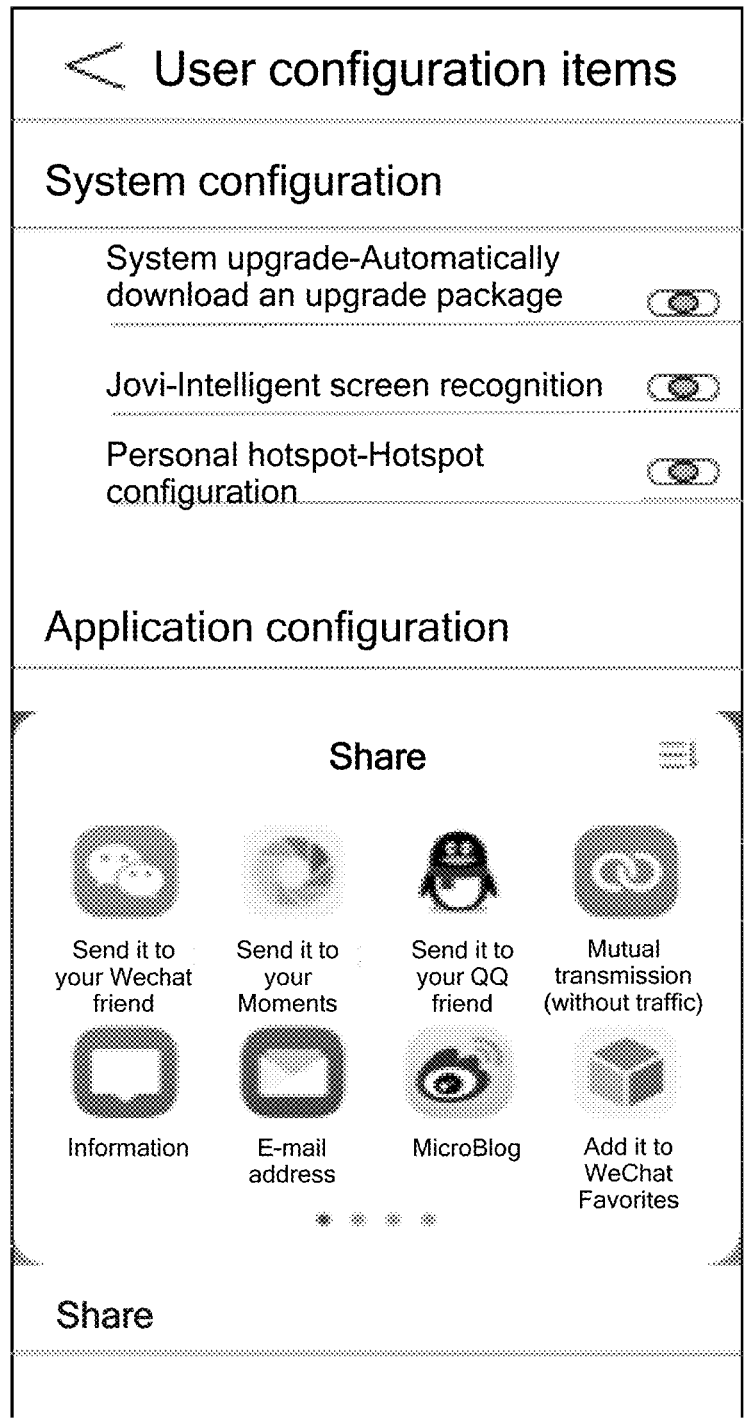
FIG. 4B is a schematic diagram of a communication tool selection interface according to a specific embodiment of the present disclosure.

Further, as shown in FIG. 4A, a virtual button indicating "Export a configuration file" and a virtual button indicating "Share" may further be displayed on the "User configuration items" page. After the user clicks the virtual button indicating "Share", a communication tool selection interface may pop up on the mobile phone, as shown in FIG. 4B, so that the user can select a target communication tool to share corresponding configuration information. If the user clicks the virtual button indicating "Export a configuration file", a configuration file can be exported locally for being shared. In addition, after the user clicks the virtual button indicating "Share" or the virtual button indicating "Export a configuration file", a page for selecting "User configuration items" may further pop up. On the page for selecting "User configuration items", the user can select all or a part of "User configuration items", or modify some of the configuration items (the configuration items are invalid for the mobile phone), and share selected and/or modified configuration through files, WeChat, Bluetooth, or the like.

Figure 5:
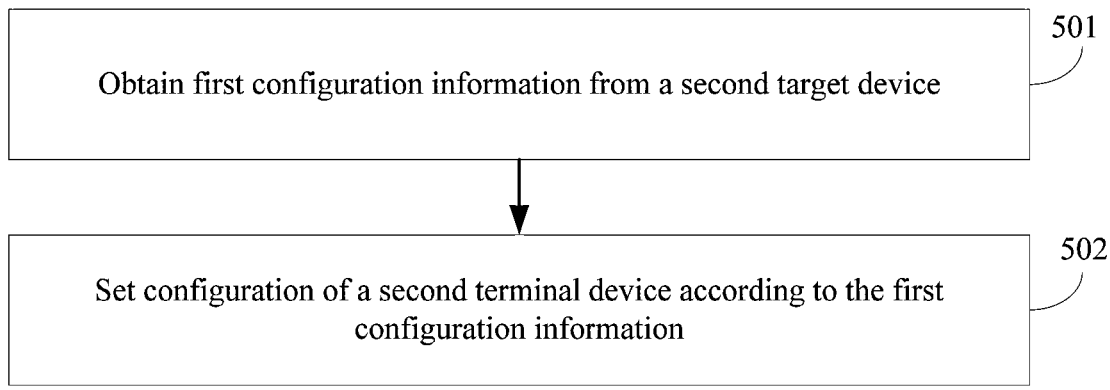
FIG. 5 is a flowchart of another configuration information sharing method according to an embodiment of the present disclosure.

Referring to FIG. 5, FIG. 5 is a flowchart of a configuration information sharing method according to an embodiment of the present disclosure. The method is applied to a second terminal device. As shown in FIG. 5, the method includes the following steps.

Step 501: Obtain first configuration information from a second target device.

In this embodiment, the first configuration information may include at least one of system configuration information and application configuration information of the first terminal device. The system configuration information may be all or a part of the system configuration information of the first terminal device. The application configuration information may be all or a part of the application configuration information of the first terminal device.

In some embodiments, the second target device may be any one of the first terminal device, a cloud server, or a public platform. The first terminal device is a device different from the second terminal device.

In an implementation manner, the first terminal device is used as an example, and the second terminal device can receive the system configuration information and/or application configuration information from the first terminal device through an instant messaging tool such as Bluetooth, WeChat, SMS, or the like, so as to set its own configuration according to the received configuration information, thereby reducing repeated and complex setting operations by the user.

In another implementation manner, the cloud server is used as an example, and the second terminal device can obtain from the cloud server, for example, the system configuration information and/or application configuration information synchronously shared by the first terminal device, so as to set its own configuration according to the obtained configuration information, thereby reducing repeated and complex setting operations by the user.

In still another implementation manner, the public platform is used as an example, and the second terminal device can download from the public platform, for example, the system configuration information and/or application configuration information uploaded by the first terminal device to the public platform, so as to set its own configuration according to the downloaded configuration information, thereby reducing repeated and complex setting operations by the user.

Step 502: Set configuration of the second terminal device according to the first configuration information.

In some embodiments, when step 502 is performed, the first configuration information may be used to overwrite configuration of the second terminal device, and an overwriting strategy may be entire overwriting, selective merging, or the like.

In this embodiment of the present disclosure, the second terminal device may obtain system configuration information and/or application configuration information shared by another device, and set its own configuration according to the obtained configuration information, thereby reducing repeated and complex setting operations by users.

Figure 6:
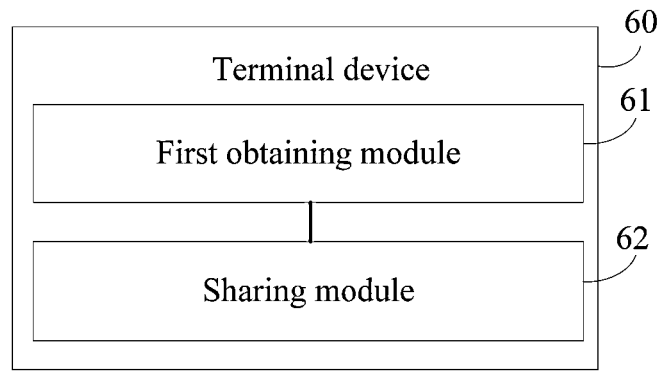
FIG. 6 is a first schematic structural diagram of a terminal device according to an embodiment of the present disclosure.

Referring to FIG. 6, FIG. 6 is a schematic structural diagram of a terminal device according to an embodiment of the present disclosure, where the terminal device is a first terminal device. As shown in FIG. 6, the terminal device 60 includes:
- a first obtaining module 61, configured to obtain first configuration information, where the first configuration information includes at least one of system configuration information and application configuration information of the first terminal device; and
- a sharing module 62, configured to share the first configuration information.

In some embodiments, the sharing module 62 is configured to:
- share the first configuration information to a first target device, where the first target device is any one of a second terminal device, a cloud server, or a public platform.

In some embodiments, when the first target device is the second terminal device or the public platform, the sharing module 62 includes:
- a display unit, configured to display a communication tool selection interface;
- a first receiving unit, configured to receive a first input for selecting a target communication tool on the communication tool selection interface; and
- a sending unit, configured to send the first configuration information to the second terminal device or the public platform through the target communication tool in response to the first input.

In some embodiments, the terminal device further includes:
- a display module, configured to display a configuration information display interface, where at least one of the system configuration information and application configuration information of the first terminal device is displayed on the configuration information display interface, the first obtaining module 61 includes:
- a second receiving unit, configured to receive a second input for selecting configuration information on the configuration information display interface; and
- an obtaining unit, configured to obtain the first configuration information in response to the second input, where the first configuration information includes at least one of the following:
- a part of the system configuration information;
- a part of the application configuration information;
- second configuration information, where the second configuration information is a part of modified system configuration information, and the second configuration information will not change configuration of the first terminal device; or
- third configuration information, where the third configuration information is a part of modified application configuration information, and the third configuration information will not change configuration of the first terminal device.

For the terminal device 60 according to this embodiment of the present disclosure, processes of the foregoing embodiments of the configuration information sharing method shown in FIG. 1 can be implemented, and a same technical effect can be achieved. To avoid repetition, details are not described herein again.

Figure 7:
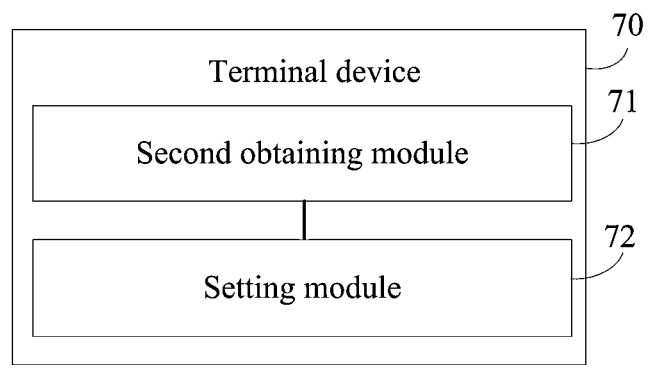
FIG. 7 is a second schematic structural diagram of the terminal device according to an embodiment of the present disclosure.

Referring to FIG. 7, FIG. 7 is a schematic structural diagram of the terminal device according to an embodiment of the present disclosure, where the terminal device is a second terminal device. As shown in FIG. 7, the terminal device 70 includes:

a second obtaining module 71, configured to obtain first configuration information from a second target device; and a setting module 72, configured to set configuration of a second terminal device according to the first configuration information.

The first configuration information includes at least one of system configuration information and application configuration information of a first terminal device. The second target device is any one of the first terminal device, a cloud server, or a public platform.

For the terminal device 70 according to this embodiment of the present disclosure, processes of the foregoing embodiments of the configuration information sharing method shown in FIG. 5 can be implemented, and a same technical effect can be achieved. To avoid repetition, details are not described herein again.

In addition, an embodiment of the present disclosure further provides a terminal device, including a processor, a memory, and a computer program that is stored in the memory and that can be run on the processor, where when the computer program is executed by the processor, processes of the foregoing embodiments of the configuration information sharing method shown in FIG. 1 or FIG. 5 are implemented, and a same technical effect can be achieved. To avoid repetition, details are not described herein again.

Figure 8:
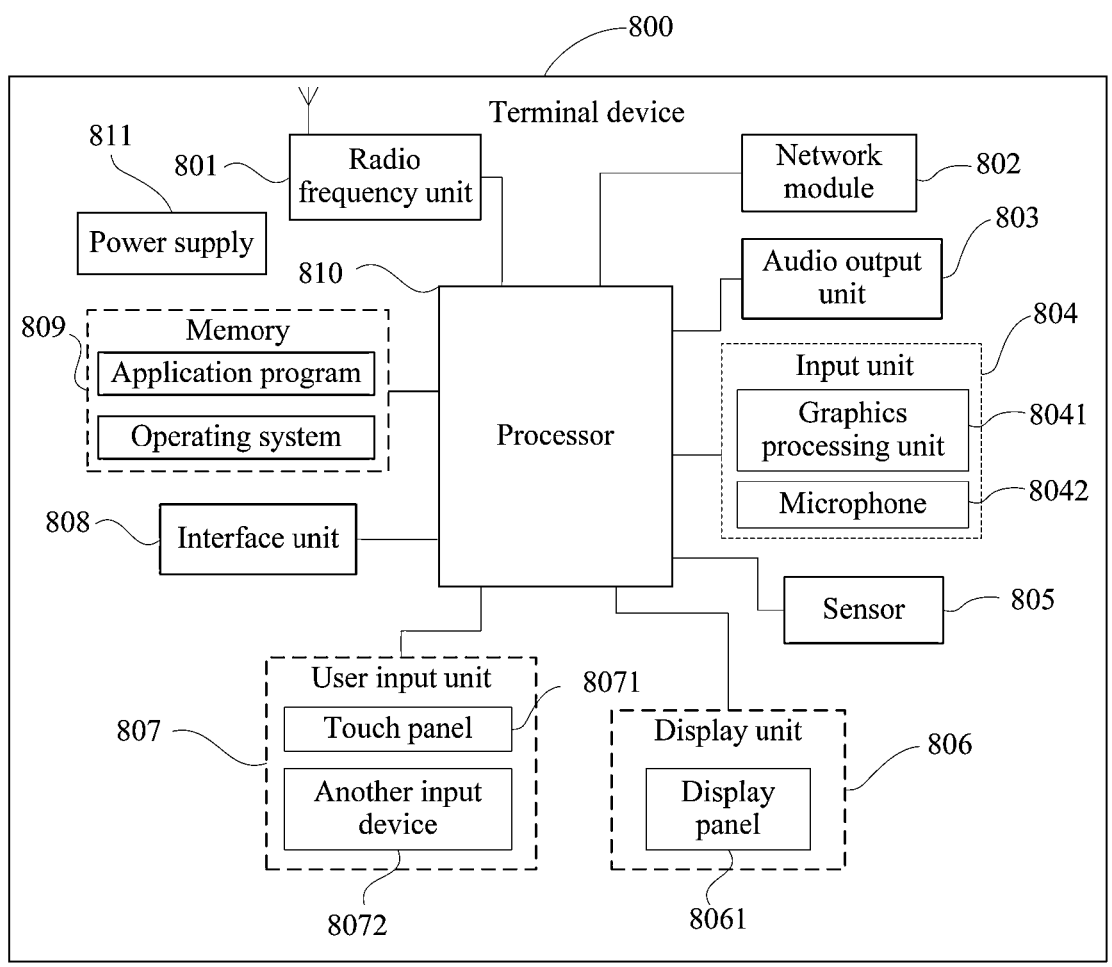
FIG. 8 is a third schematic structural diagram of the terminal device according to an embodiment of the present disclosure.

Referring to FIG. 8, FIG. 8 is a schematic structural diagram of hardware of a terminal device according to embodiments of the present disclosure. The terminal device 800 includes but is not limited to: a radio frequency unit 801, a network module 802, an audio output unit 803, an input unit 804, a sensor 805, a display unit 806, a user input unit 807, an interface unit 808, a memory 809, a processor 810, a power supply 811, and other components. It can be understood by a person skilled in the art that, a terminal device structure shown in FIG. 8 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a laptop computer, a palmtop computer, an in-vehicle terminal device, a wearable device, a pedometer, and the like.

In some embodiments, when the terminal device 800 is the foregoing first terminal device, the processor 810 is configured to: obtain first configuration information, where the first configuration information includes at least one of system configuration information and application configuration information of the terminal device 800; and share the first configuration information.

In some embodiments, when the terminal device 800 is the foregoing second terminal device, the processor 810 is configured to: obtain first configuration information from a second target device; and set configuration of the terminal device 800 according to the first configuration information. The first configuration information includes at least one of system configuration information and application configuration information of a first terminal device. The second target device is any one of the first terminal device, a cloud server, or a public platform.

For the terminal device 800 according to this embodiment of the present disclosure, processes implemented in the method embodiment shown in FIG. 1 or FIG. 5 can be implemented. To avoid repetition, details are not described herein again.

It should be understood that, in this embodiment of the present disclosure, the radio frequency unit 801 may be configured to receive and send information or receive and send a signal in a call process. For example, after downlink data from a base station is received, the processor 810 processes the downlink data. In addition, uplink data is sent to the base station. Usually, the radio frequency unit 801 includes but is not limited to an antenna, at least one amplifier, a transceiver, a coupler, a low noise amplifier, a duplexer, and the like. In addition, the radio frequency unit 801 may further communicate with a network and another device through a wireless communications system.

The terminal device provides wireless broadband Internet access for the user by using the network module 802, for example, helping the user send and receive an e-mail, browse a web page, and access streaming media.

The audio output unit 803 may convert audio data received by the radio frequency unit 801 or the network module 802 or stored in the memory 809 into an audio signal and output the audio signal as a sound. In addition, the audio output unit 803 may further provide audio output (for example, a call signal received voice, or a message received voice) related to a function executed by the terminal device 800. The audio output unit 803 includes a loudspeaker, a buzzer, a receiver, and the like.

The input unit 804 is configured to receive an audio signal or a video signal. The input unit 804 may include a Graphics Processing Unit (GPU) 8041 and a microphone 8042. The graphics processing unit 8041 processes image data of a static picture or a video obtained by an image capture apparatus (for example, a camera) in video capture mode or image capture mode. A processed image frame may be displayed on the display unit 806. The image frame processed by the graphics processing unit 8041 may be stored in the memory 809 (or another storage medium) or sent by using the radio frequency unit 801 or the network module 802. The microphone 8042 can receive sound and can process such sound into audio data. Processed audio data can be converted, in telephone call mode, into a format that can be sent to a mobile communication base station via the radio frequency unit 801 for output.

The terminal device 800 further includes at least one sensor 805, such as an optical sensor, a motion sensor, and other sensors. For example, the light sensor includes an ambient light sensor and a proximity sensor. The ambient light sensor may adjust luminance of the display panel 8061 based on brightness of ambient light. The proximity sensor may turn off the display panel 8061 and/or backlight when the terminal device 800 is moved to an ear. As a type of the motion sensor, an accelerometer sensor may detect an acceleration value in each direction (generally, three axes), and detect a value and a direction of gravity when the accelerometer sensor is static, and may be used for recognizing a posture of the terminal device (such as screen switching between landscape and portrait modes, a related game, or magnetometer posture calibration), a function related to vibration recognition (such as a pedometer or a knock), and the like. The sensor 805 may further include a fingerprint sensor, a pressure sensor, an iris sensor, a molecular sensor, a gyroscope, a barometer, a hygrometer, a thermometer, an infrared sensor, and the like. Details are not described herein.

The display unit 806 is configured to display information input by a user or information provided for a user. The display unit 806 may include a display panel 8061. The display panel 8061 may be configured in a form of a Liquid Crystal Display (LCD), an Organic Light-Emitting Diode (OLED), or the like.

The user input unit 807 may be configured to receive input digit or character information, and generate a key signal input related to a user setting and function control of the terminal device. For example, the user input unit 807 includes a touch panel 8071 and another input device 8072. The touch panel 8071 is also referred to as a touchscreen, and may collect a touch operation performed by a user on or near the touch panel 8071 (such as an operation performed by a user on or near the touch panel 8071 by using any proper object or accessory, such as a finger or a stylus). The touch panel 8071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 810, and receives and executes a command sent by the processor 810. In addition, the touch panel 8071 may be implemented by using a plurality of types such as a resistive type, a capacitive type, an infrared ray, and a surface acoustic wave. The user input unit 807 may include other input devices 8072 in addition to the touch panel 8071. For example, the another input device 8072 may include but is not limited to: a physical keyboard, a function button (such as a volume control button, a switch button), a trackball, a mouse, and a joystick, which is not described herein.

Further, the touch panel 8071 can cover the display panel 8061. When detecting a touch operation on or near the touch panel, the touch panel 8071 transmits the touch operation to the processor 810 to determine a type of a touch event. Then the processor 810 provides corresponding visual output on the display panel 8061 based on the type of the touch event. In FIG. 8, although the touch panel 8071 and the display panel 8061 are used as two independent parts to implement input and output functions of the terminal device, in some embodiments, the touch panel 8071 and the display panel 8061 may be integrated to implement the input and output functions of the terminal device. This is not specifically limited herein.

The interface unit 808 is an interface for connecting an external apparatus to the terminal device 800. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 808 may be configured to receive input (for example, data information and power) from an external apparatus and transmit the received input to one or more elements in the terminal device 800 or may be configured to transmit data between the terminal device 800 and the external apparatus.

The memory 809 may be configured to store a software program and various data. The memory 809 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 809 may include a high-speed random access memory, and may further include a nonvolatile memory, for example, at least one magnetic disk storage device, a flash storage device, or another volatile solid-state storage device.

The processor 810 is a control center of the terminal device, is connected to each part of the entire terminal device by using various interfaces and lines, and performs various functions of the terminal device and data processing by running or executing the software program and/or the module that are/is stored in the memory 809 and invoking data stored in the memory 809, to perform overall monitoring on the terminal device. The processor 810 may include one or more processing units. For example, the processor 810 may be integrated with an application processor and a modem processor. The application processor mainly processes an operating system, a user interface, an application program, and the like, and the modem processor mainly processes wireless communication. It can be understood that, for example, the modem processor may not be integrated into the processor 810.

The terminal device 800 may further include the power supply 811 (for example, a battery) configured to supply power to various components. For example, the power supply 811 may be logically connected to the processor 810 through a power management system, so as to implement functions such as managing charging, discharging, and power consumption through the power management system.

In addition, the terminal 800 may further include some functional modules not shown. Details are not described herein again.

An embodiment of the present disclosure further provide a computer-readable storage medium. The computer-readable storage medium stores a computer program, and when the computer program is executed by a processor, the processes of the foregoing embodiments of the configuration information sharing method applied to the terminal device can be implemented, and a same technical effect can be achieved. To avoid repetition, details are not described herein again. The computer-readable storage medium is, for example, a Read-Only Memory (ROM), a Random Access Memory (RAM), a magnetic disk, or an optical disc.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the descriptions of the foregoing implementation manner, a person skilled in the art may clearly understand that the method in the foregoing embodiment may be implemented by software in addition to a necessary universal hardware platform or by hardware only. In most circumstances, the former is an exemplary implementation manner. Based on such understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal device (which may be a mobile phone, a computer, a server, an air conditioner, a network device, or the like) to perform the method described in the embodiments of the present disclosure.

The embodiments of the present disclosure are described with reference to the accompanying drawings. However, the present disclosure is not limited to the foregoing implementation manners. The foregoing implementation manners are merely examples, but are not limiting. A person of ordinary skill in the art may make many forms without departing from the objective and the scope of the claims of the present disclosure, and these forms all fall within the protection scope of the present disclosure.

The invention claimed is:

1. A configuration information sharing method, performed by a first terminal device, the method comprising:
   obtaining first configuration information, wherein the first configuration information comprises at least one of system configuration information or application configuration information of the first terminal device, wherein the first configuration information further comprises information modified by a user of the first terminal device based on configuration information of the first terminal device, wherein the modification keeps the configuration of the first terminal device unchanged; and
   sharing the first configuration information with a first target device using a communication tool selected by the user when the first target device comprises a second terminal device or a public platform.

2. The configuration information sharing method according to claim 1, wherein the first target device further comprises a cloud server.

3. The configuration information sharing method according to claim 1, wherein sharing the first configuration information with the first target device comprises:
   displaying a communication tool selection interface;
   receiving a first input from the user for selecting the communication tool on the communication tool selection interface; and
   sending the first configuration information to the second terminal device or the public platform using the communication tool in response to the first input.

4. The configuration information sharing method according to claim 2, wherein before obtaining the first configuration information, the method further comprises:
   displaying a configuration information display interface, wherein at least one of the system configuration information or application configuration information of the first terminal device is displayed on the configuration information display interface; and
   obtaining the first configuration information comprises:
   receiving a second input for selecting configuration information on the configuration information display interface; and
   obtaining the first configuration information in response to the second input,
   wherein the first configuration information further comprises at least one of the following:
   a part of the system configuration information; or
   a part of the application configuration information,
   wherein the modified configuration information comprises a part of modified system configuration information or a part of modified application configuration information, and the modification does not change the configuration of the first terminal device.

5. A configuration information sharing method performed by a second terminal device, the method comprising:
   obtaining first information from a target device, wherein the target device comprises a first terminal device, a cloud server, or a public platform; and
   setting configuration of the second terminal device according to the obtained first information,
   wherein the obtained first information comprises at least one of system configuration information or application configuration information of the target device, wherein the obtained first information further comprises information modified by a user of the target device, wherein the modification keeps the configuration of the target device unchanged, wherein the first information obtained from the target device is shared through a communication tool selected by the user of the target device when the target device comprises the first terminal device or the public platform.

6. A terminal device, comprising: a memory having a computer program stored thereon; and a processor, wherein the computer program, when executed by the processor, causes the processor to perform a configuration information sharing method, comprising:
   obtaining first configuration information, wherein the first configuration information comprises at least one of system configuration information or application configuration information of the terminal device, wherein the first configuration information further comprises information modified by a user of the first terminal device based on configuration information of the first terminal device, wherein the modification keeps the configuration of the first terminal device unchanged; and
   sharing the first configuration information with a first target device using a communication tool selected by the user when the first target device comprises a second terminal device or a public platform.

7. The terminal device according to claim 6, wherein the first target device further comprises a cloud server.

8. The terminal device according to claim 6, wherein sharing the first configuration information with the first target device comprises:
   displaying a communication tool selection interface;
   receiving a first input from the user for selecting the communication tool on the communication tool selection interface; and
   sending the first configuration information to another terminal device or the public platform using the communication tool in response to the first input.

9. The terminal device according to claim 7, wherein before obtaining the first configuration information, the method further comprises:
   displaying a configuration information display interface, wherein at least one of the system configuration information or application configuration information of the terminal device is displayed on the configuration information display interface, and
   wherein obtaining the first configuration information comprises:
   receiving a second input for selecting configuration information on the configuration information display interface; and
   obtaining the first configuration information in response to the second input,
   wherein the first configuration information further comprises at least one of the following:
   a part of the system configuration information; or
   a part of the application configuration information, wherein the modified configuration information comprises a part of modified system configuration information or a part of modified application configuration information, and the modification does not change the configuration of the terminal device.

10. A terminal device, comprising: a memory having a computer program stored thereon; and a processor, wherein the computer program, when executed by the processor, causes the processor to perform a configuration information sharing method, comprising: obtaining first information from a target device, wherein the target device comprises a first terminal device, a cloud server, or a public platform; and setting configuration of the terminal device according to the obtained first information, wherein the obtained first information comprises at least one of system configuration information or application configuration information of the target device, wherein the obtained first information further comprises information modified by a user of the target device, wherein the modification keeps the configuration of the target device unchanged, wherein the first information obtained from the target device is shared through a communication tool selected by the user of the target device when the target device comprises the first terminal device or the public platform.

* * * * *